(No Model.)
D. M. FORSYTH.
CORN PLANTER.
No. 508,930.          Patented Nov. 21, 1893.
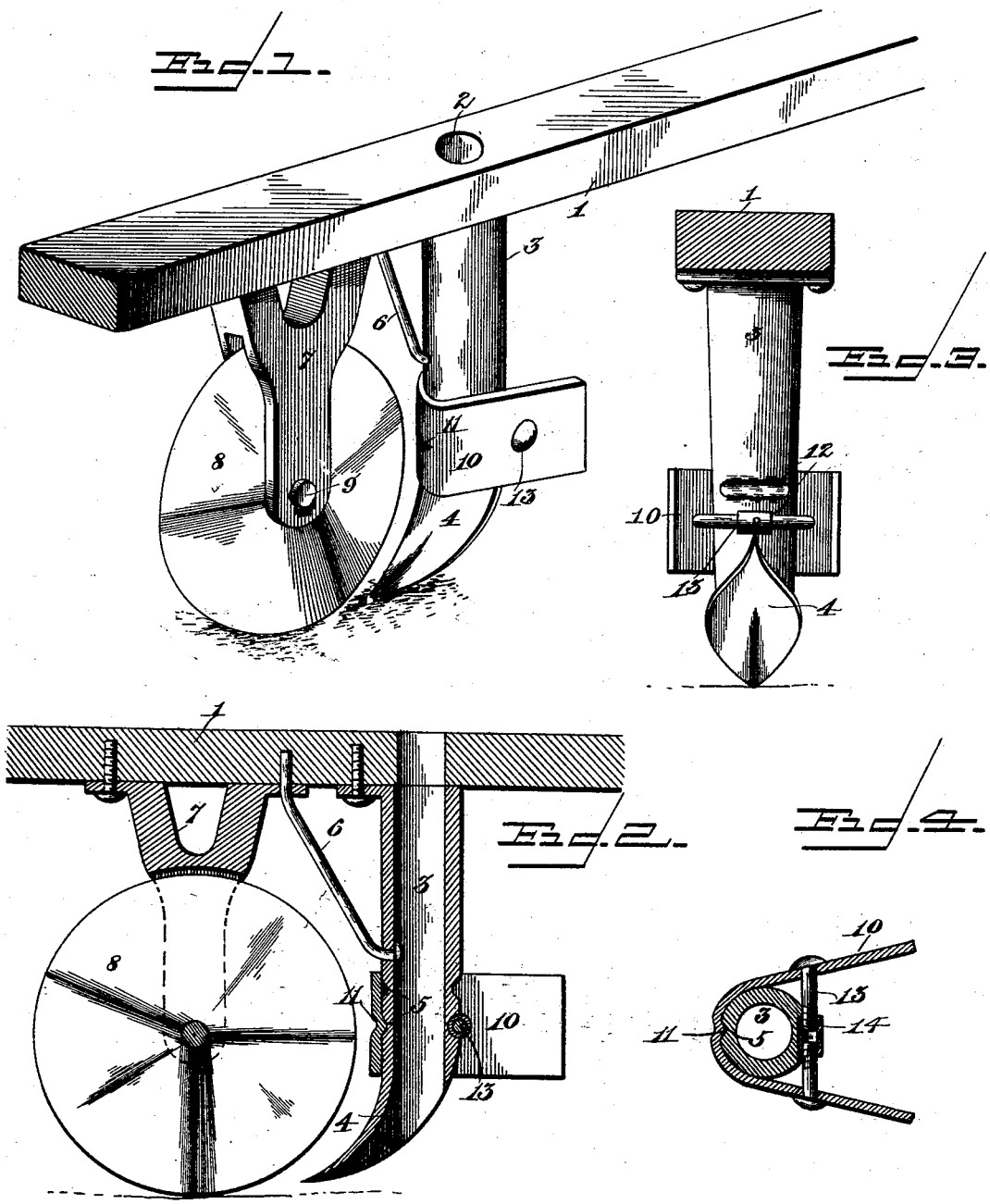
Inventor:
Daniel M. Forsyth.
Witnesses:
E. K. Stewart
W. S. Duvall
By his Attorneys.
C. A. Snow & Co.

UNITED STATES PATENT OFFICE.

DANIEL M. FORSYTH, OF FRANKLIN, INDIANA.

CORN-PLANTER.

SPECIFICATION forming part of Letters Patent No. 508,930, dated November 21, 1893.

Application filed June 20, 1893. Serial No. 478,240. (No model.)

*To all whom it may concern:*

Be it known that I, DANIEL M. FORSYTH, a citizen of the United States, residing at Franklin, in the county of Johnson and State of Indiana, have invented a new and useful Corn-Planter, of which the following is a specification.

My invention relates to improvements in corn planters; the objects in view being to provide a cheap and simple machine adapted for this purpose and so constructed as to form a furrow, cut away the sod and any trash in advance thereof and deposit the corn in the bottom; and to provide means for covering the corn at any suitable depth regardless of the depth of the furrow.

Further objects and advantages of the invention will appear in the following description and the novel features thereof will be particularly pointed out in the claims.

Referring to the drawings—Figure 1 is a perspective view of a planter embodying my invention, the hopper being removed. Fig. 2 is a vertical longitudinal sectional view through the seed tube. Fig. 3 is a rear elevation thereof. Fig. 4 is a horizontal section thereof.

Like numerals of reference indicate like parts in all the figures of the drawings.

The beam 1 may be surmounted by any suitable hopper (not shown), and in the beam there is formed a hole 2 through which the seed pass into the seed tube 3 which is secured to the under side of the beam in line with the opening. The lower end of the tube is cut away at its rear side and is spread and otherwise shaped to form a shovel 4, or a shovel may be attached thereto, as may be desired. Immediately above the shovel the front side of the tube is provided with a transverse crease or countersink 5. Above this crease an inclined brace 6 is secured to the front side of the tube and to the under side of the beam 1. A Y-shaped standard 7 is secured to the under side of the beam immediately in front of the seed tube and is slotted at its lower end for the reception of a colter-wheel 8, through which the axle 9 is passed, the same passing into the opposite bifurcations. A wing or blade 10 is bent around the front end of the tube and its terminals extend in rear thereof and at an angle thereto, inasmuch as they diverge. This wing at its front bent end is provided with a transverse indentation 11 which fits in the crease or countersink 5 of the tube so that it is prevented from being vertically displaced when once secured in position, as will hereinafter appear. The rear side of the tube is provided with a plurality of grooves 12, and a tie-bolt 13 passes through perforations in the divergent terminals of the wing and serves to secure the same together so that they embrace the opposite sides of the tube. The tie-bolt is formed in sections and is provided at its center with a turn-buckle or sleeve 14 reversely threaded at its opposite ends so as engage corresponding threads on the bolt. By a proper adjustment of this turn-buckle it will be seen that the sections of the tie-bolt may be spread or contracted and thus the terminals of the wing likewise are spread or contracted. The tie-bolt may be loosened and the wing moved up or down so that the said bolt takes into any one of the grooves in the rear side of the tube, and likewise the indentation at the front side of the wing takes into any one of the creases or countersinks in the front side of the tube.

In operation it will be seen that the corn may be planted at any desired depth, and yet by a lateral adjustment of the wing the soil displaced by the shovel may be returned in any predetermined quantity; that is to say, the corn may be planted at a depth, as for instance, ten inches, and yet there be but five inches of soil over the corn. Such planting is a great protection to the corn in case of droughts, as has been demonstrated and often practiced in certain sections of the country. As the colter proceeds in advance of the shovel it cuts the sod, forms an opening into which the shovel may readily wedge itself so that there is a decrease of draft required and the corn is dropped directly behind the shovel and colter before any of the dirt rolls back into the furrow. The wing scrapes all the weeds and other trash out of the way and permits only a limited or predetermined amount of dirt to return.

If desired the brace-rod 6 may be connected to the seed-tube 3 by an ordinary break-pin, so that should the tube abut against a stone Having described my invention, what I claim is—

1. In a corn planter, the combination with a seed tube terminating at its lower end in a shovel, of a wing embracing said tube extending in rear of and at an angle thereto, and a sectional bolt located in the terminals of the wing and having right and left hand threaded screws, and an adjusting sleeve connected to the ends of the bolt, substantially as specified.

2. In a corn planter, the combination with a beam and tube, the latter terminating at its lower end in a shovel and having its front and rear sides provided with transverse grooves or countersinks, of a wing bent around the tube terminating in rear of and extending at an angle thereto, said wing being provided at its front side with a transverse depression for engaging the crease or groove at the front side of the tube, and a bolt passing through the terminals of the wing in rear of the tube and resting in any one of the grooves of said tube, substantially as specified.

In testimony that I claim the foregoing as my own I have hereto affixed my signature in the presence of two witnesses.

DANIEL M. FORSYTH.

Witnesses:
W. T. PRITCHARD,
SAML. FEATHERNGILL.